Sept. 14, 1926.
C. W. BURROWS
1,599,645
METHOD OF TESTING MAGNETIZABLE OBJECTS
Filed Jan. 26, 1924    3 Sheets-Sheet 1
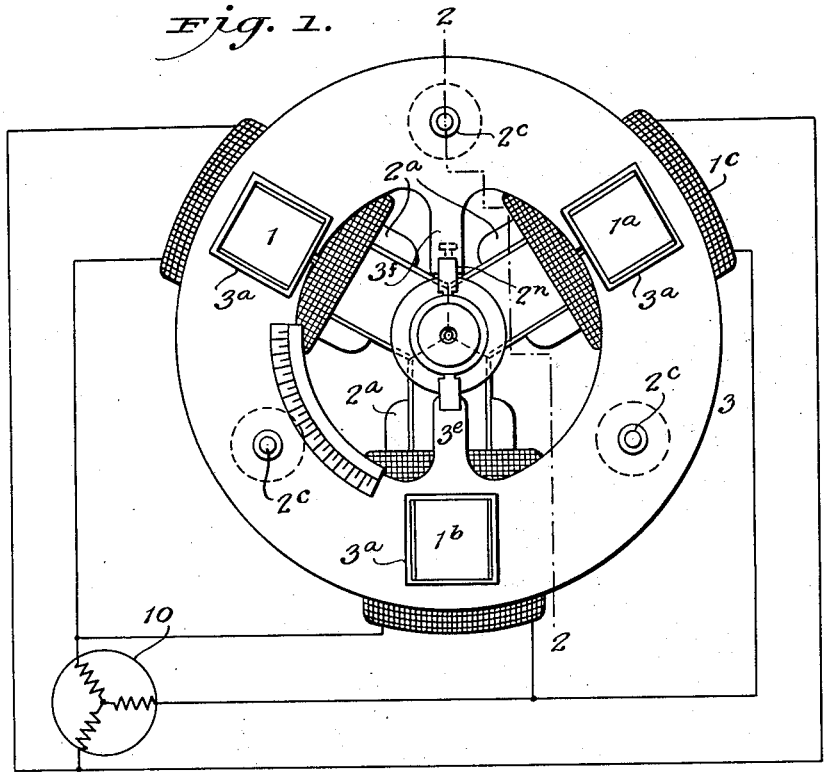
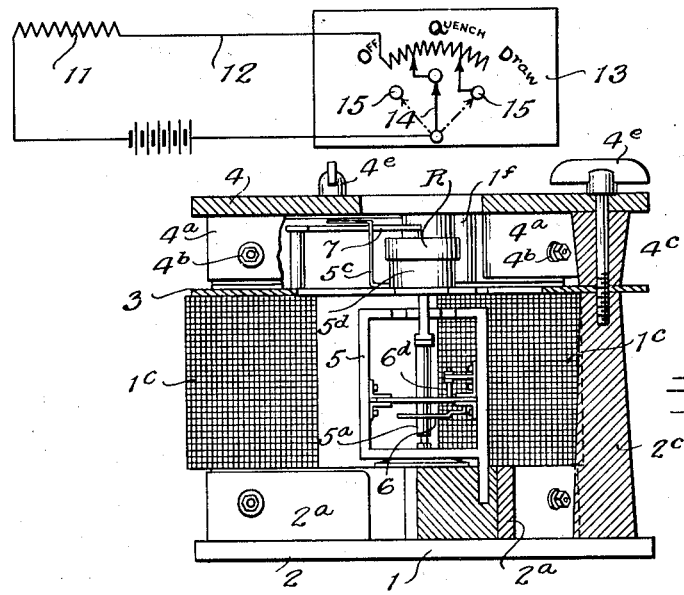
INVENTOR
Charles W. Burrows
BY
ATTORNEY Sept. 14, 1926.

C. W. BURROWS 1,599,645

METHOD OF TESTING MAGNETIZABLE OBJECTS

Filed Jan. 26, 1924     3 Sheets-Sheet 2

INVENTOR
Charles W. Burrows
BY
ATTORNEY

Sept. 14, 1926.

C. W. BURROWS 1,599,645

METHOD OF TESTING MAGNETIZABLE OBJECTS

Filed Jan. 26, 1924 3 Sheets-Sheet 3

INVENTOR
Charles W. Burrows
BY
ATTORNEY

Patented Sept. 14, 1926.

1,599,645

UNITED STATES PATENT OFFICE.

CHARLES W. BURROWS, OF NEW YORK, N. Y., ASSIGNOR TO BURROWS MAGNETIC EQUIPMENT CORPORATION, OF JERSEY CITY, NEW JERSEY, A CORPORATION OF DELAWARE.

METHOD OF TESTING MAGNETIZABLE OBJECTS.

Application filed January 26, 1924. Serial No. 688,757.

This invention relates to improvements in methods of testing magnetizable objects. An object of the present invention is to provide a novel method for magnetically determining any one of a number of physical characteristics of a specimen, when all of such physical characteristics are unknown.

A specific object is the provision of such a method in which the measurement made is always the magnetic interaction or torque developed between a specimen and a relatively moving magnetic field.

A further object of the invention is to provide a method of the general character disclosed in Patent No. 1,459,970, issued to me on June 26, 1923.

A still further specific object of the invention is the provision of a method of detecting the physical characteristics of a specimen produced respectively by the temperatures at which the specimen has been quenched and drawn when both the quenching and drawing temperatures are unknown quantities.

With these and other objects in view, the invention consists in certain novel features of construction and combinations and arrangements of parts as will be more fully hereinafter described and pointed out in the claims.

Figure 3:
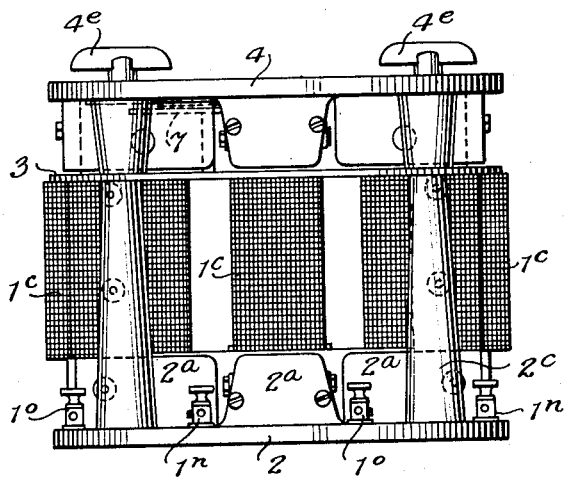
Figure 4:
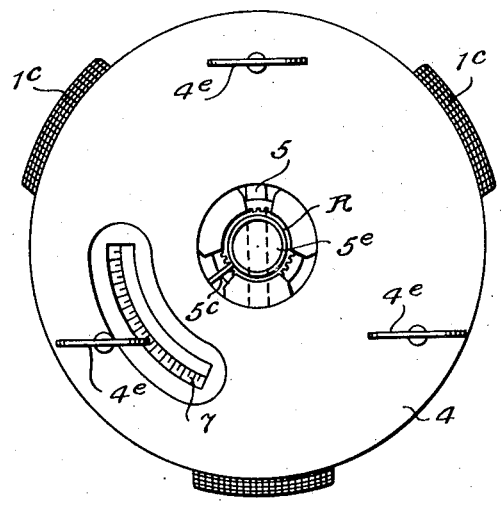
Figure 5:
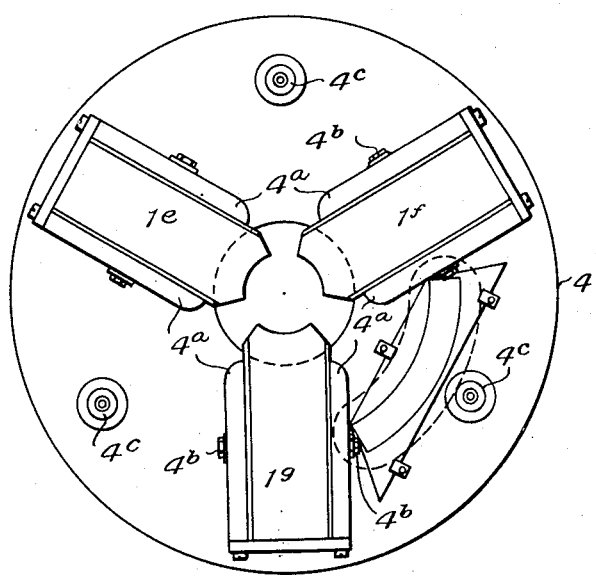
Figure 6:
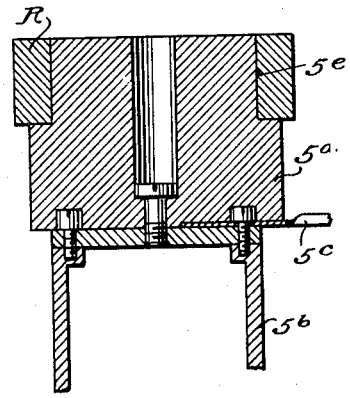
Figure 7:
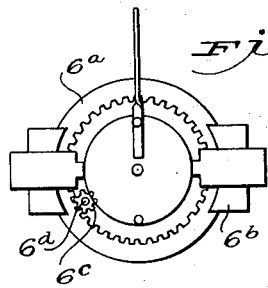
Figure 8:
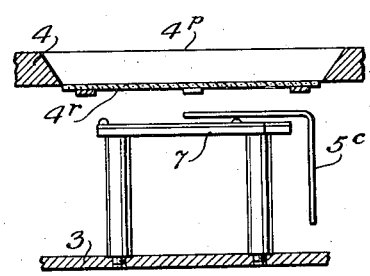
Figure 9:
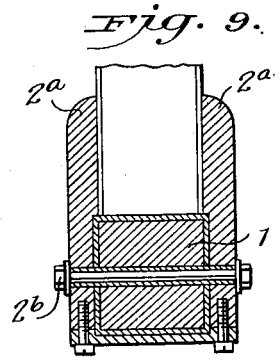
Figure 10:
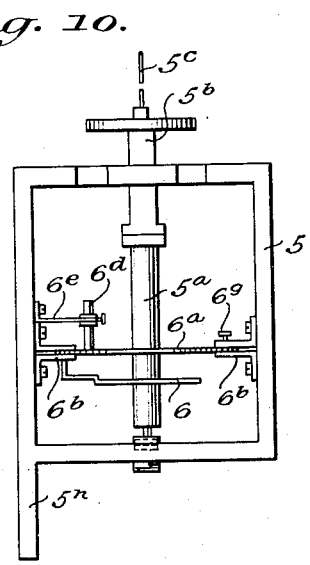
Figure 11:
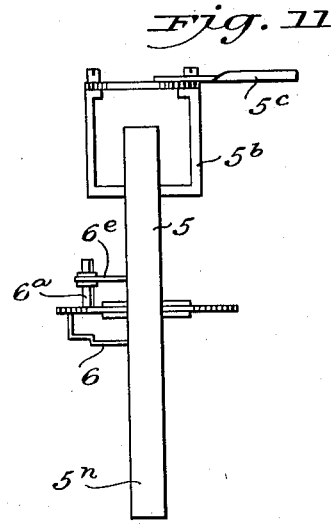

In the accompanying drawings,

Fig. 1 is an enlarged plan view of the lower part of the apparatus shown in Fig. 3, the top plate and pole-pieces being removed, Fig. 2 is a detail sectional view on the line 2—2 of Fig. 1, Fig. 3 is a side elevation of an apparatus particularly designed for testing ball-races, and the like objects, Fig. 4 is a top plan view of Fig. 3, Fig. 5 is an underneath view of the top plate and attached pole-pieces, Fig. 6 is an enlarged detail view of the object holder, Fig. 7 is a detail plan view of the object holding devices detached, with a support 5$^d$ removed, Figs. 8 and 9 are detail sectional views, and Figs. 10 and 11 are side and edge views respectively, of the object holding devices shown in Fig. 7, Before proceeding to describe the apparatus in detail, it may be well to note that the apparatus is quite similar to that shown in my previous patent above referred to, except that means are provided for varying and predetermining the magnetizing force used in testing. The method differs from the previously patented method in the maintenance of the field within defined and predetermined limits. When one magnetizing force is used, the magnetic torque developed will indicate one distinct physical characteristic; when another magnetizing force is used, the torque developed will indicate another distinct physical characteristic. In explaining the invention, I shall describe first, the old or conventional apparatus and its method of operation; secondly, the new apparatus; and thirdly, the new methods used and the principles involved in the use of these methods.

Conventional apparatus.

The apparatus shown in the drawings includes a three-phase electro-magnet, the core portions 1, 1$^a$ and 1$^b$, of which are preferably made of laminated plates of magnetic material of high permeability and low core loss and these cores are surrounded by wire coils 1$^c$. These core portions are preferably united by forming the cores and yokes of approximately U-shaped plates; each plate forms part of two adjacent core pieces and the connecting yoke, and the plates are arranged as shown in Fig. 1 so that there will be a uniform and continuous metal conduit for the magnetic lines of force at the base of the apparatus between the several cores 1, 1$^a$ and 1$^b$. These laminated plates may be mounted on a base member 2, which may be made of non-magnetic material of any suitable construction and is provided with pairs of radially disposed flanges 2$^a$ to and between which the yokes are fastened by means of bolts 2$^b$ as indicated in the drawings (Fig. 9).

The upper ends of the cores 1, 1$^a$ and 1$^b$ are connected to and by a plate 3 which should be made of non-magnetic material and is provided with openings 3$^a$ for the upper ends of the cores, and may be supported on and fastened to the upper ends of posts 2$^c$ rising from base 2 intermediate the poles as shown. The binding posts for the electrical connections to and between the several coils 1ᶜ are arranged on the base 2, as shown at 1ⁿ and 1ᵒ so that the coils of several cores may be properly connected in sequence.

The upper magnetic pole pieces 1ᵉ, 1ᶠ and 1ᵍ (Figs. 2 and 5) may be made separate from the cores; and in the construction shown are made of laminated plates like the cores and attached to a removable top plate or casting 4 which is provided with pairs of parallel radially disposed flanges 4ᵃ to and between which the pole pieces are secured by means of bolts 4ᵇ as indicated in the drawings.

Plate 4 is provided with depending studs 4ᵉ corresponding in position to posts 2ᶜ and adapted to overlie the same. And the plate 4 may be detachably secured to posts 2ᶜ by means of bolts 4ᶜ passing through openings in studs 4ᵉ and engaging threaded sockets in posts 2ᶜ as shown. When plate 4 is in position over the plate 3 the under sides of the poles 1ᵉ, 1ᶠ, 1ᵍ have a close metallic contact with the upper ends of the cores 1, 1ᵃ, 1ᵇ and form magnetic continuations of the cores; and a magnetic field will be created adjacent to and intermediate the ends of these poles 1ᵉ, 1ᶠ, 1ᵍ when parts are properly assembled and the magnet is energized.

The base 2 is preferably, and plates 3 and 4 should be, made of non-magnetic material so that they will not disturb the lines of force, and the most intense field of force will be established between the inner ends of the poles 1ᵉ, 1ᶠ, 1ᵍ.

Arranged between the magnet coils and below the plate 3 is a frame 5 (Fig. 2) which may be supported and guided in brackets 3ᵉ, 3ᶠ on the plate 3, and is preferably removable and replaceable. The frame 5 has a stud 5ⁿ on its lower end which is adapted to be engaged with a socket in a stud on base member 2, see Fig. 2, to hold the frame securely and vertically adjustably in place.

In frame 5 is a rotatable spindle 5ᵃ, which may be mounted on pivot bearings as shown, or other suitable bearings, so that it will turn without perceptible friction. To the spindle 5ᵃ is connected one end of a spring 6 (Fig. 2) the other end of which is connected to a relatively fixed point, and its tension may be regulated in any suitable manner. As shown the outer end of the spring is attached to an annulus 6ᵃ guided in brackets 6ᵇ on the sides of the frame 5; and this annulus has internal teeth engaged by a small pinion 6ᶜ on a key-shaft 6ᵈ journaled in a bracket 6ᵉ attached to the frame 5; and by turning key 6ᵍ the annulus can be turned to regulate the tension of the spring 6 and the annulus can be locked when adjusted by any suitable means.

As shown shaft 5ᵃ carries a yoke 5ᵇ on its upper end, which embraces and rises above the top bar of the frame 5 and carries an object support 5ᵈ (Figs. 2 and 6) which may be detachably attached thereto; said support being made of non-magnetic material, and has in the example shown an annular portion 5ᵉ over which a ball race R to be tested can be removably fitted; such ball race being readily replaceable or removable from the support 5ᵈ. An indicating finger 5ᶜ is attached to yoke 5ᵇ and is bent so that its outer end moves past a graduated scale 7 which may be suitably supported upon the plate 3, as indicated in the drawings. The scale 7 lies beneath a sight opening 4ᵖ in plate 4, which opening may be covered by a glass 4ʳ as shown.

The object R to be tested can be supported closely adjacent to and between the inner ends of the poles 1ᵉ, 1ᶠ, 1ᵍ, and if the magnets were rotated, such object would be subjected to the action of a rotative magnetic field. In the construction shown, however, instead of rotating the magnet, the coils are energized successively by the components of a three-phase current, or by a suitably commutated direct current, so as to create a rotative or whirling magnetic field of force between the poles. This rotative magnetic field will establish a magnetic flux or stress in the ball race or object R which will tend to cause this race to turn with the rotating field, and amount of the torque and the extent to which the race will be turned will depend upon the physical properties of the race and the resistance of the spring 6 to rotatory displacement of the spindle 5ᵃ which carries the race or object to be tested.

The specific constructions of parts shown are not essentials of the present invention and may be varied by skilled mechanics to suit the particular objects to be tested.

*New apparatus.*

In Fig. 1, I have shown diagrammatically the three-phase generator 10, which is used in exciting the electro-magnets. The energizing coil 11 for the generator is in a closed direct current circuit 12, wherein I arrange a rheostat 13. This type of rheostat is disclosed in my pending application, Serial No. 684,368 filed on the 4th of January, 1924, and is for the purpose of automatically selecting those magnetizing forces which are suitable for testing heat-treated steel to determine the quenching and drawing temperatures of the specimen. The rheostat includes the arm 14 adapted to selectively coact with any of a series of contacts 15 to either open the circuit 12, throw a low resistance in the circuit, or throw a high resistance in the circuit. When a high resistance is thrown in, the energizing coil 11 is energized by a current suitable for energizing the electro-magnets to test the drawing temperature of a specimen and when a low resistance is thrown in, a relatively greater energizing current is caused to pass through the coil 11 and the magnets are consequently energized in a manner suitable for testing the quenching temperature of the specimen.

In the pending application above referred to, I have disclosed a general theory by which the respective physical characteristics of a specimen produced by quenching and drawing the specimen might be determined, and it will be recalled that in testing for the physical characteristics produced by quench. a magnetizing force is used which is between 75% and 125% of the force necessary to reach the point of maximum differential permeability in the object. In testing for draw, a small magnetizing force is used, this force being of only a threshold value, preferably less than 25% of the force necessary to reach the point of maximum differential permeability in the object.

I have discovered that the principle involved may be applied equally well to the type of rotary analyzer shown in this application, the method used being substantially as follows: A standard specimen R is placed in the analyzer and the arm 14 of the rheostat moved to the central contact 15. The point to which the needle moves on the indicating scale is noted. When a non-standard specimen is substituted for the standard specimen, the difference in the readings on the indicating scale is a direct indication of the differences in quenching temperature. When the arm 14 is moved to the contact 15 marked "Draw" and a similar operation performed, the difference in the readings on the graduated scale are direct indications of the difference in that physical characteristic produced by drawing temperature.

While the apparatus which I have shown is designed primarily for determining one or both of the physical characteristics produced by two operations in heat treatment when both characteristics are unknown, it will be apparent that the same principle may be applied to testing for various other physical characteristics, it being merely necessary to predetermine the particular magnetizing force necessary for giving a direct indication of the particular physical characteristic in question.

Although I have shown a rheostat in the circuit of the exciting coil of a three-phase generator, it will be apparent that various other means might be utilized for regulating the magnetizing force of a relatively rotatable magnetic field.

Various slight changes and alterations might be made in the general form and arrangement of the parts described without departing from the invention, and hence I do not wish to limit myself to the precise details set forth, but shall consider myself at liberty to make such changes and alterations as fairly fall within the spirit and scope of the appended claims.

I claim:

1. A method of testing magnetizable objects to determine the physical characteristics of the objects produced by the temperature at which the object was drawn, consisting in placing the object in a magnetic field, maintaining the intensity of the field at or near its threshold value, producing relative rotation between the object and field, and noting the magnetic torque developed between the object and field by such relative rotation.

2. A method of testing magnetizable objects to determine the physical characteristics of the object which are a factor of the drawing temperature of such object, consisting in placing the object in a magnetic field, maintaining the maximum intensity of the field at a value less than 25% of the value necessary to reach the point of maximum differential permeability in the object, producing relative rotation between the object and field, and noting the magnetic interaction or torque developed between the object and field.

3. A method of testing magnetizable objects to determine the physical characteristics of the object which are a factor of the temperature at which the object was quenched, consisting in placing the object in a magnetic field, maintaining the maximum intensity of the field at or near the intensity necessary to produce maximum differential permeability in the object, producing relative rotation between the object and field, and noting the magnetic torque developed between the object and field by such rotation.

4. A method of testing magnetizable objects to determine those physical characteristics of the object which are a factor of the temperature at which such object was quenched, consisting in placing the object in a magnetic field, maintaining the maximum intensity of the field at a value between 75% and 125% of the value necessary to reach the point of maximum differential permeability in the object, producing relative rotation between the object and field, and noting the magnetic torque developed between the object and field by such relative rotation.

5. A method of testing magnetizable objects which consists in subjecting the object to the action of a relatively moving magnetic field, maintaining the maximum intensity of the field within pre-determined limits based upon the intensity of the field necessary to reach the point of maximum differential permeability in the object, yieldingly opposing said relative movement, and noting the magnetic drag developed by such relative movement.

6. A method of testing magnetizable objects which consists in subjecting the object to the action of a relatively moving magnetic field, maintaining the maximum intensity of the field within pre-determined fractional values of the intensity necessary to produce maximum differential permeability in the object, yieldingly opposing said relative movement, and noting the magnetic drag developed by said relative movement.

CHARLES W. BURROWS.